T. D. AYLESWORTH.
Hop Culture:
No. 12,374. Patented Feb. 13, 1855.
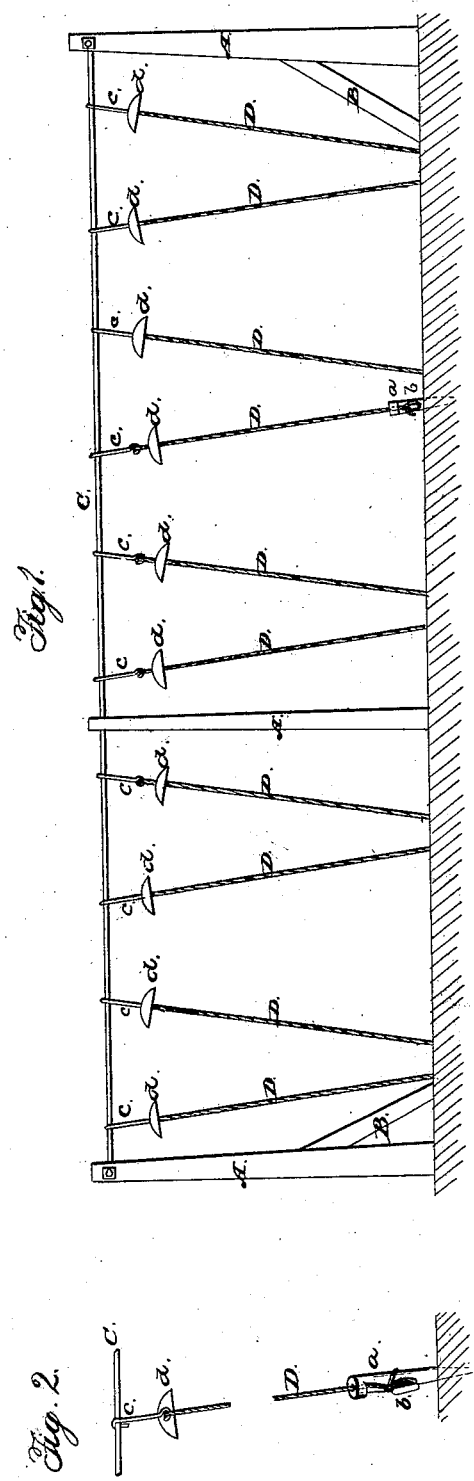

UNITED STATES PATENT OFFICE.

THOMAS D. AYLESWORTH, OF FRANKFORT, NEW YORK.

IMPROVEMENT IN HOP-FRAMES.

Specification forming part of Letters Patent No. 12,374, dated February 13, 1855.

*To all whom it may concern:*

Be it known that I, THOMAS D. AYLESWORTH, of Frankfort, in the county of Herkimer and State of New York, have invented certain new and useful Improvements in Frames for Training Hop and other Vines; and I do hereby declare the following to be a full, clear, and exact description of the same, reference being had to the accompanying drawings, making a part thereof, in which—

Figure 1 represents an elevation of a section or portion of one of the frames, and Fig. 2 represents one of the training cords or wires with its bottom and top fastenings detached.

Similar letters in both figures denote like parts.

The nature of my invention relates to a method of training hop and other vines upon permanent frames so arranged as that the portions upon which the vine runs or entwines may be loosened at their upper ends and taken or laid down to gather the product and then returned to their proper positions on the frames with great ease and facility.

To enable others skilled in the art to make and use my invention, I will proceed to describe the same with reference to the drawings.

I first, at suitable distances through the field, plant permanent supporting-posts A, firmly held against lateral tension or strain by braces B on one, two, or more of its sides. To the tops of these supporting-posts I attach cords or wires C, sufficiently strong to sustain the weight of the vines. This much of the frame may be constructed in the most substantial manner, as it is to be a permanent and durable fixture. In the ground, immediately underneath the line of wires C, (or on each side of said line, as the hop-grower may elect,) I drive, at suitable distances apart, the pins or anchors $a$, which may be of iron or durable wood and provided with belaying-cleats or other equivalent fastenings, $b$, to which one end of each of the vertical training wires or cords D is secured. The training-wires extend from these pins or anchors up to the main supporting wire or cord C, their upper ends being provided with a hook, $c$, acting like a clothes-pin to grasp the wire or cord C sufficiently tight to hold it in place, and yet be readily unhooked when they are to be taken down to gather the products of the vine. The training-wires D may have their top ends evenly disposed or at equal distances apart on the supporting-wire; but their lower ends may be drawn together where they are secured in the ground. This is for the double purpose of giving the vines as they run up more room, light, and sun, and also to spread the training-cords toward the top to prevent the vines from reaching to and running on any other than its own cord, which, if allowed, would prevent the training-cords from being taken down separately in case it should become necessary to pick off whatever of the product may be ripened or matured without injury to the unripe, which may be allowed more time for maturing.

Near the top of the training-cords D, I place an inverted-cup-shaped piece, $d$, made of any suitable material, having a smooth surface, concave on its lower side for the purpose of turning downward the top of the vine when it reaches that point to prevent it from entwining the supporting-wires C, in which case the cord D could not readily be unhooked and taken down. This might be avoided by having the supporting-wires above any possible point which the vine might reach; but then the hook or catch would be equally difficult to fasten or let go. Besides, it would require greater length of training-cord and be in every way more expensive and troublesome, the object being to readily put up, take down, or entirely remove the training wires or cords and leave the permanent part of the frame untouched.

An inspection of the drawings will readily show the very great facility with which each training-cord may be lowered, the natural product gathered, and then again replaced without injury to the vine or the unripe product thereon. When the crop is gathered the pins or anchors and the training-cords may be housed or allowed to remain out, depending upon the durable character of the material of which they are composed.

Having thus fully described the nature of my invention, I would state that I do not claim the training of hop or other vines on wires or cords, as this has been done before; but

What I do claim as new, and desire to secure by Letters Patent, is—

1. In combination with the permanently-arranged supporting cord or wire C, the training cords or wires D, leading from the ground to said supporting-wire and connected thereto by a spring-hook or its equivalent, so as to be readily connected to or detached from the supporting-wire, for the purpose and in the manner set forth.

2. In combination with the training-cord D, the inverted cup d, for turning down the top of the vine and preventing it from entwining the supporting-wire, substantially as set forth.

THOS. D. AYLESWORTH.

Witnesses:
MELVILLE C. SMITH,
GEO. B. JUDD.